(12) United States Patent
Oono

(10) Patent No.: US 8,774,867 B2
(45) Date of Patent: Jul. 8, 2014

(54) IMAGE DISPLAY SYSTEM, TERMINAL DEVICE, IMAGE DISPLAY METHOD AND PROGRAM

(75) Inventor: Katsumaru Oono, Tokyo (JP)

(73) Assignee: NEC Corporation, Tokyo (JP)

( * ) Notice: Subject to any disclaimer, the term of this patent is extended or adjusted under 35 U.S.C. 154(b) by 1056 days.

(21) Appl. No.: 11/915,641

(22) PCT Filed: May 24, 2006

(86) PCT No.: PCT/JP2006/310401
§ 371 (c)(1),
(2), (4) Date: Nov. 27, 2007

(87) PCT Pub. No.: WO2006/126615
PCT Pub. Date: Nov. 30, 2006

(65) Prior Publication Data
US 2009/0209292 A1     Aug. 20, 2009

(30) Foreign Application Priority Data
May 27, 2005 (JP) ................................. 2005-155382

(51) Int. Cl.
*H04B 1/38* (2006.01)

(52) U.S. Cl.
USPC ............ 455/566; 455/412.1; 455/412.2; 455/414.1; 382/115; 382/117; 382/118

(58) Field of Classification Search
USPC ......... 455/566, 412.1, 412.2, 414.1; 382/115, 382/118, 117
See application file for complete search history.

(56) References Cited

U.S. PATENT DOCUMENTS

| 2003/0093817 | A1 | 5/2003 | Lee |
| 2003/0112244 | A1* | 6/2003 | Matsuyama .................. 345/473 |
| 2003/0112259 | A1* | 6/2003 | Kinjo ............................. 345/700 |
| 2003/0123621 | A1* | 7/2003 | Fukuda ....................... 379/88.13 |
| 2004/0085259 | A1 | 5/2004 | Tarlton et al. |
| 2008/0215884 | A1* | 9/2008 | Yonemoto ..................... 713/168 |

FOREIGN PATENT DOCUMENTS

| CN | 1411664 A | 4/2003 |
| EP | 1 619 909 A1 | 1/2006 |
| JP | 2000332904 A | 11/2000 |
| JP | 2001344613 | 12/2001 |
| JP | 2002044285 | 2/2002 |
| JP | 2002044285 A * | 2/2002 |

(Continued)

OTHER PUBLICATIONS

PCT/JP2006/310401 International Search Report, mailed Jul. 18, 2006.

(Continued)

*Primary Examiner* — Khalid Shaheed
(74) *Attorney, Agent, or Firm* — Sughrue Mion, PLLC

(57) ABSTRACT

To provide an image display system, a terminal device, an image display method and a program in which an image displayed on the screen of the other terminal during telephone conversation is controlled with a simple circuit configuration, and a line transmission capacity is reduced. A self terminal device 100 sends data for switching images displayed on a terminal device 200 at the other end via a network 500 by using an electronic mail, a multi-call function or a discriminating tone. The terminal device 200 controls and switches the images concerning the terminal device 100 within the terminal device 200 based on such various kinds of received information.

6 Claims, 5 Drawing Sheets

(56) References Cited

FOREIGN PATENT DOCUMENTS

| | | |
|---|---|---|
| JP | 2003244425 | 8/2003 |
| JP | 2004015158 | 1/2004 |
| JP | 2005064939 | 3/2005 |
| JP | 2005078315 A | 3/2005 |
| WO | 03/010986 A1 | 2/2003 |

OTHER PUBLICATIONS

The Extended European Search Report for EP Application No. 06756561.4 dated on Jun. 24, 2013.
Office action in Chinese counterpart patent application, 20060018557.1, dated Apr. 1, 2012.
Japanese Office Action for JP2007-517878 mailed on May 22, 2012.

\* cited by examiner

F I G. 1
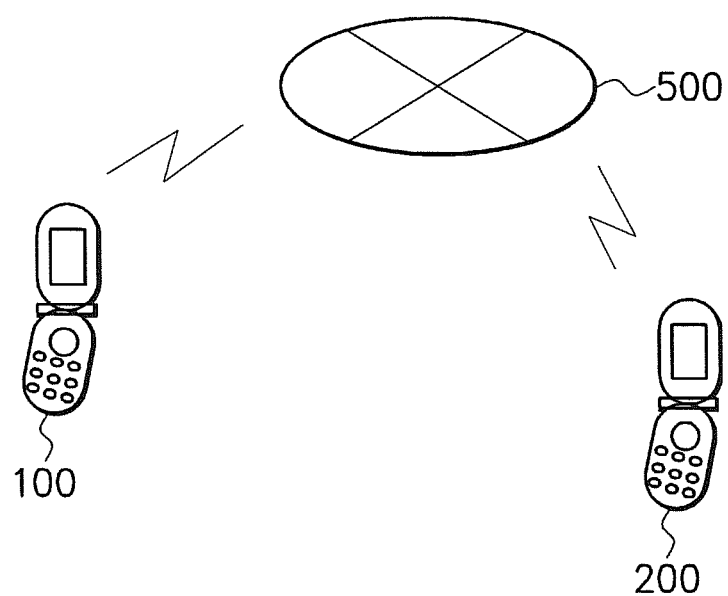

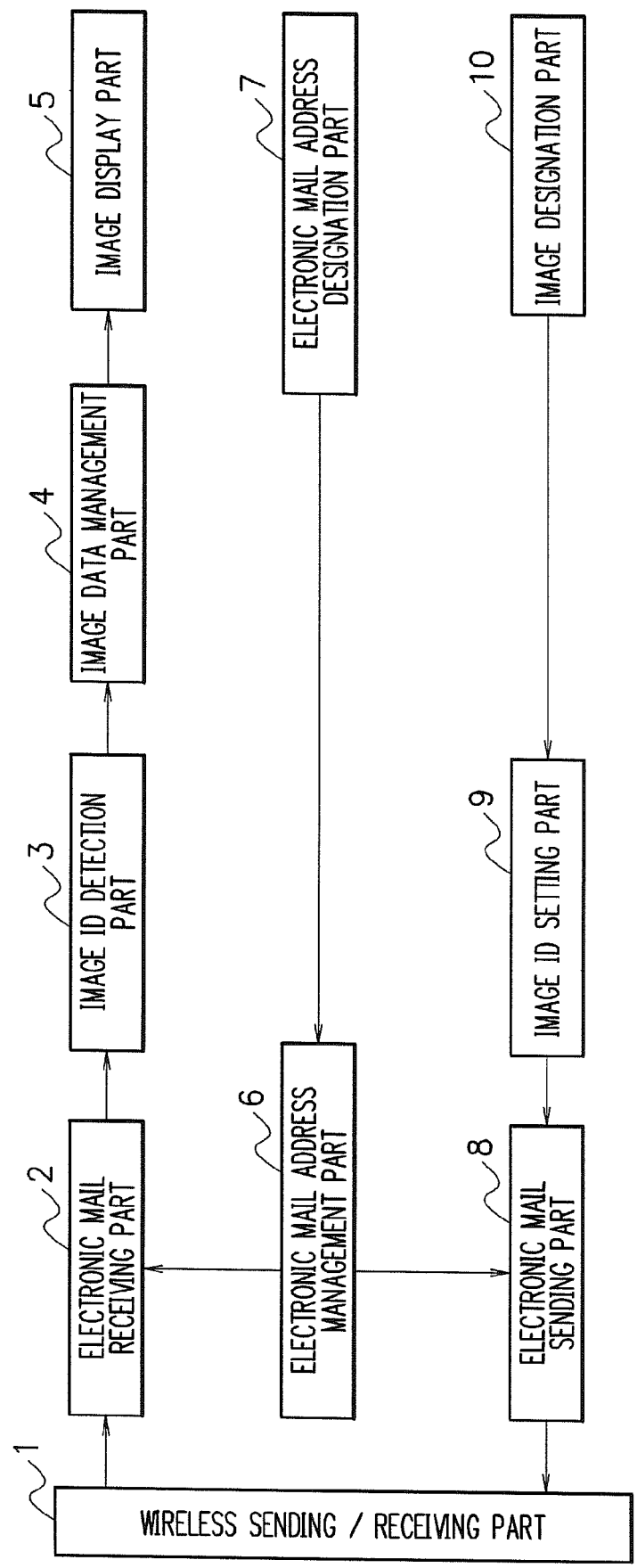
F I G. 2

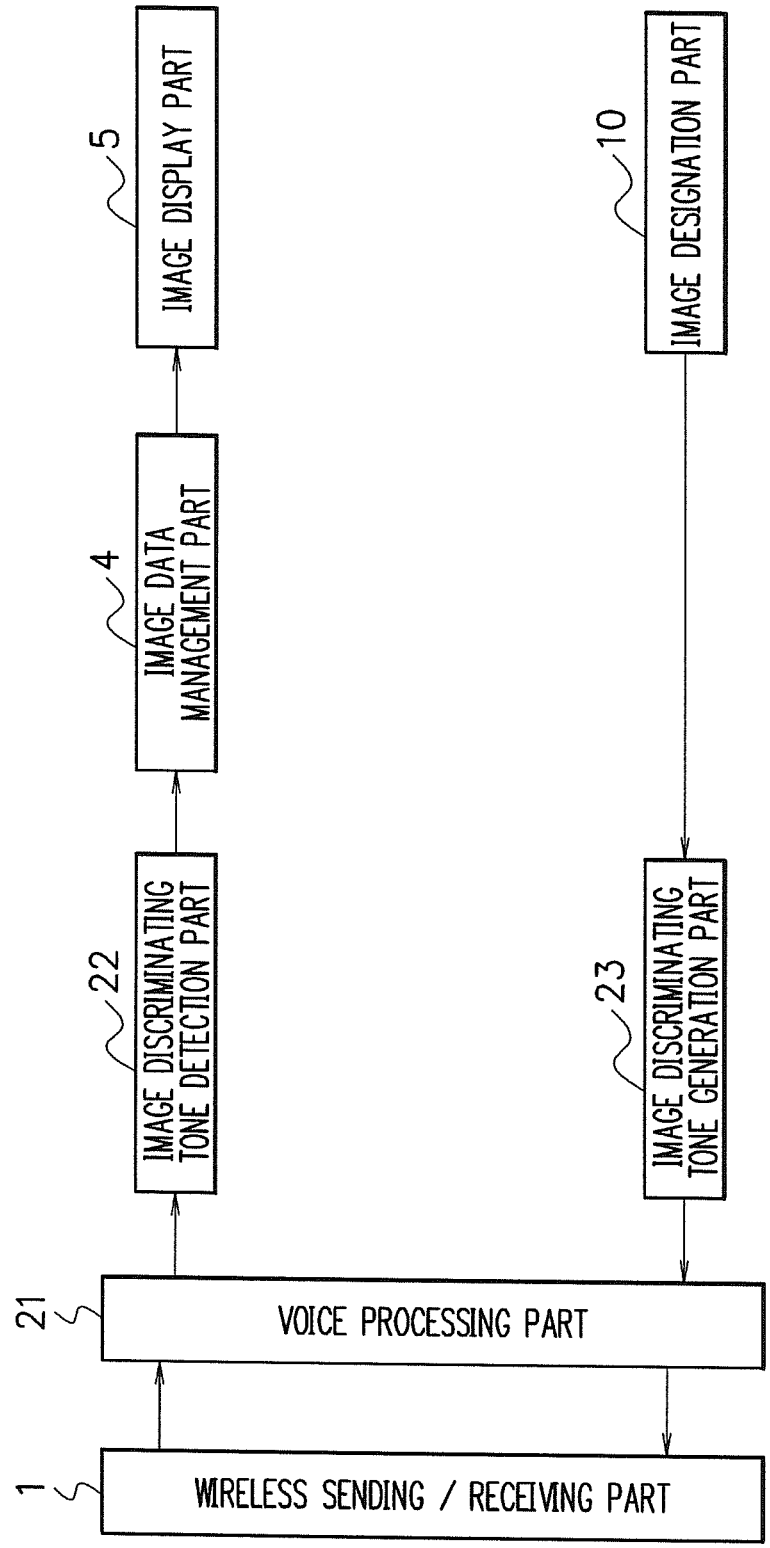
F I G. 4

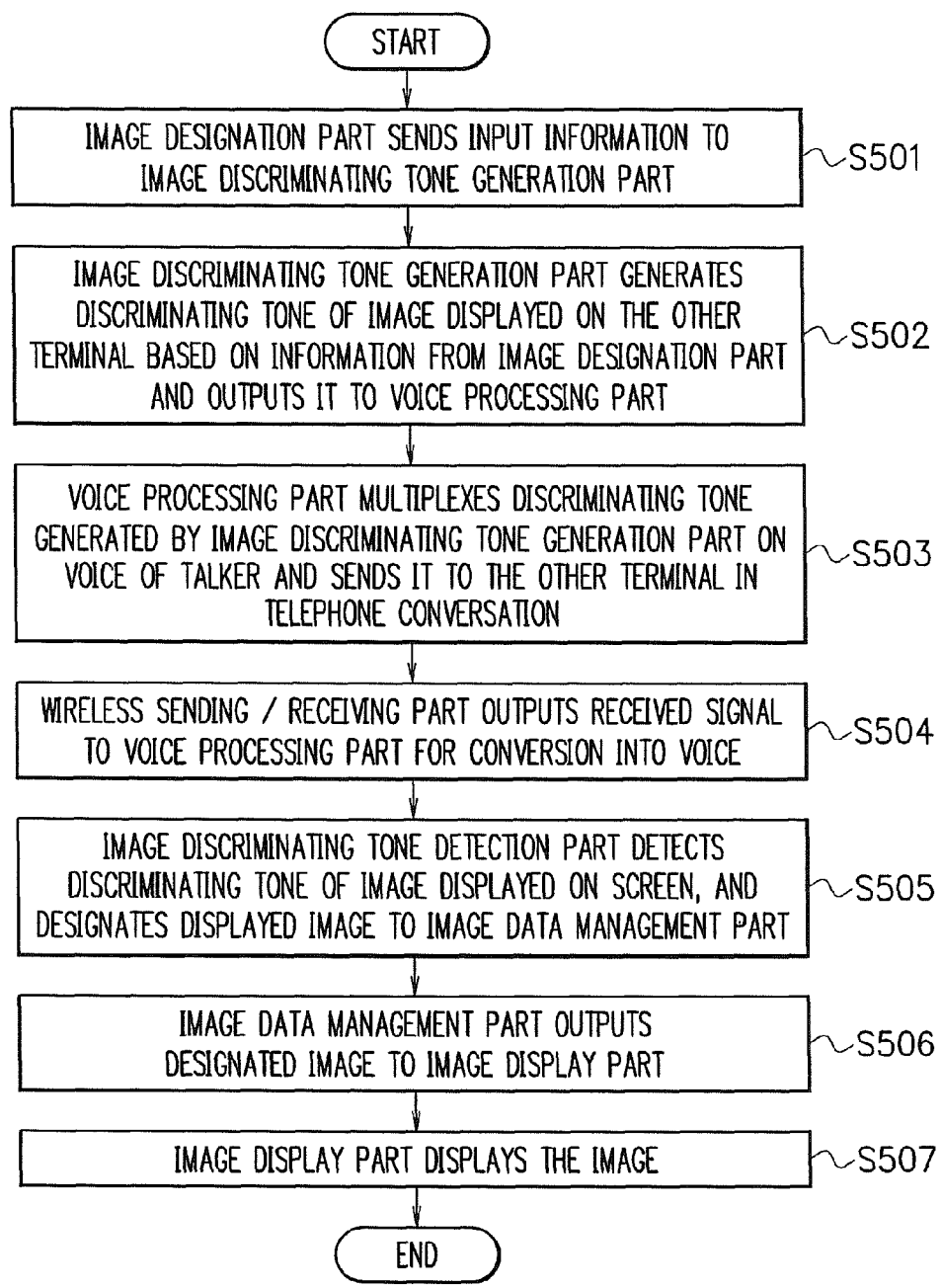

IMAGE DISPLAY SYSTEM, TERMINAL DEVICE, IMAGE DISPLAY METHOD AND PROGRAM

TECHNICAL FIELD

The present invention pertains to an image display system, a terminal device, an image display method and a program in which a function of switching images displayed on a screen of a terminal device of another party through a simple procedure is implemented without comprising a complex unit.

BACKGROUND ART

In recent years, the number of portable telephone terminals which allow the user to transmit not only sounds but also images to another terminal during a telephone conversation on the portable telephone set and make the telephone conversation while the user sees the image transmitted from another terminal has increased.

Firstly, with the conventional portable telephone terminal having a function of sending not only sounds but also images to another terminal to allow a telephone conversation while the user sees images intended by another party during the telephone conversation on the portable telephone set, a function of sending a fictitious character image stored in the self portable telephone terminal to another terminal is also equipped.

The image transmitted to another terminal is the "image being taken by a camera outfitted with the portable telephone" or "fictitious character image stored in the self portable telephone terminal".

This function includes transmission of different kinds of expressions or motion to the party at the other end where an image's expressions or motion is controlled by a key operation at the image sending side.

In this manner, the conventional portable telephone terminal has a function of switching the image data stored in the self portable telephone to be sent to the party at the other end in accordance with topics or feelings during telephone conversation, and a function of displaying the image data sent from the party at the other end.

Herein, a technique for confirming the feeling, convenience and intent of a caller at the time of call incoming has been proposed in which when a call originating operation of the portable telephone set is performed, an image selected by an image selection part is read from an image storage part, and sent to the destination by an image sending/receiving part, and when the image is received via the image sending/receiving part at the time of call incoming, the received image is displayed on an image display part before an off-hook operation of the portable telephone set is performed (e.g., refer to Patent Document 1).

Also, a technique for displaying character animation according to voices on the display screen of the portable telephone terminal in a relatively simple way has been proposed in which character data representing a character is stored beforehand in a storage part of the portable telephone terminal, a level of a received voice signal is detected, and animation of the character is displayed on an image display part in response to the voice level, whereby the character data is composed of sub-parts that are variation form of main parts of the character, the sub-parts are exchanged according to the voice signal level, and the character is activated by receiving a control signal of the character from the other terminal during telephone conversation (e.g., refer to Patent Document 2).

Patent Document 1: Japanese Patent Laid-Open No. 2004-015158
Patent Document 2: Japanese Patent Laid-Open No. 2005-064939

However, there are following problems with the conventional examples as described above.

To send the image to another terminal during telephone conversation, it is required to have an image sending/receiving part, which makes the configuration of the portable telephone complex, leading to increased current consumption. Also, it is required to have a transmission band at the time of transmitting the image, increasing a line transmission capacity.

Further, the operation for the user to send a control signal is troublesome, whereby it is required to display an operation screen to transmit an electronic mail even temporarily, and interrupt a part of the image enjoyed between the communication parties.

DISCLOSURE OF THE INVENTION

Thus, it is an exemplary object of the invention to provide an image display system, a terminal device, an image display method and a program in which images displayed on a screen of another terminal during telephone conversation is controlled with a simple circuit configuration, and line transmission capacity is reduced.

An exemplary embodiment provides an image display system comprising a plurality of terminal devices connected via a network, characterized in that images displayed on a terminal device are switched by an electronic mail.

In image display system according to this embodiment, the sending of the electronic mail may be made by a key button operation.

Another exemplary embodiment provides an image display system comprising a plurality of terminal devices connected via a network, characterized in that images displayed on a terminal device are switched by a switch signal sent out with a multi-call function.

Another exemplary embodiment provides an image display system comprising a plurality of terminal devices connected via a network, characterized in that images displayed on a terminal device are switched by a discriminating tone.

In the image display system according to this exemplary embodiment, the discriminating tone may be one accompanying a switching signal for a displayed image, the switching signal being generated based on an expression of a talker that is captured by a camera provided on a terminal device.

Another exemplary embodiment provides the image display system according to any one of the above-described embodiments, wherein images to be displayed during a telephone conversation is sent to a terminal of a party at the other end prior to the telephone conversation, and the terminal of the party displays images during the telephone conversation.

Another exemplary embodiment provides a terminal device characterized in that images displayed on another terminal device connected via a network are switched by using an electronic mail.

In the terminal device according to this exemplary embodiment, the sending of the electronic mail may be made by a key button operation.

Another exemplary embodiment provides a terminal device characterized in that images displayed on another terminal device connected via a network are switched by a switch signal sent out with a multi-call function.

Another exemplary embodiment provides a terminal device characterized in that images displayed on another terminal device connected via a network are switched by a discriminating tone.

In the terminal device according to the exemplary embodiment, the discriminating tone may be one accompanying a switching signal for a displayed image, the switching signal being generated based on an expression of a talker that is captured by a camera provided on a terminal device.

In the terminal device according to any one of the above-described exemplary embodiments, images to be displayed during a telephone conversation may be sent to a terminal of a party at the other end prior to the telephone conversation, and the terminal of the party may display images during the telephone conversation.

Another exemplary embodiment provides an image display method using a plurality of terminal devices connected via a network, switching images displayed on a terminal device by an electronic mail.

In the image display method according to this exemplary embodiment, wherein sending of the electronic mail may be made by a key button operation.

Another exemplary embodiment provides an image display method using a plurality of terminal devices connected via a network, switching images displayed on a terminal device by a switch signal sent out with a multi-call function.

Another exemplary embodiment provides an image display method using a plurality of terminal devices connected via a network, switching images displayed on a terminal device by a discriminating tone.

In the image display method according to the exemplary embodiment, the discriminating tone may be one accompanying a switching signal for a displayed image, the switching signal being generated based on an expression of a talker that is captured by a camera provided on a terminal device.

In the image display method according to any one of the above-described exemplary embodiments, images to be displayed during a telephone conversation may be sent to a terminal of a party at the other end prior to the telephone conversation, and the terminal of the party may display images during the telephone conversation.

Another exemplary embodiment provides a program for causing an information processing apparatus to perform processes according to any one of the above-described exemplary embodiments.

With the image display system, the terminal device, the image display method and the program of the invention, it is possible to control the image displayed on a screen of a terminal during telephone conversation with a simple circuit configuration, and reduce the line transmission capacity.

BRIEF DESCRIPTION OF THE DRAWINGS

FIG. 1 is a schematic configuration view of an image display system according to an embodiment of the present invention;

FIG. 2 is a diagram showing the configuration of a terminal device according to a first embodiment of the invention;

FIG. 4 is a diagram showing the configuration of a terminal device according to a second embodiment of the invention; and FIG. 5 is a flowchart showing the operation of an image display process according to the second embodiment of the invention.

DESCRIPTION OF SYMBOLS

Figure 3:
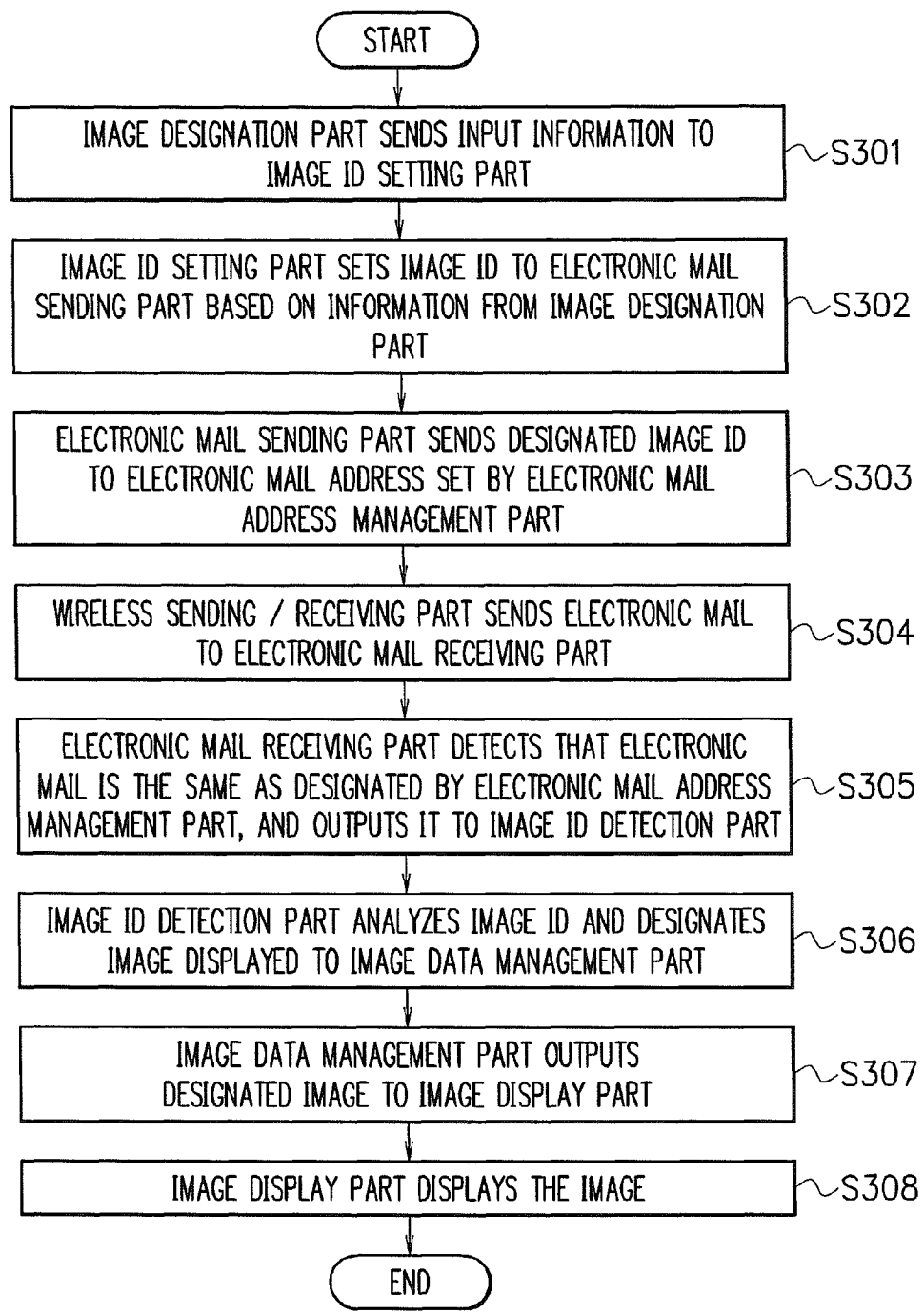
FIG. 3 is a flowchart showing the operation of an image display process according to the first embodiment of the invention.

100, 200 terminal device
500 network

Exemplary Embodiments

A first embodiment of the present invention will be described below with reference to the drawings.

Referring to FIG. 1, an image display system according to this embodiment comprises a terminal device 100, and a terminal device 200 used for communication with the terminal device 100. Also, the terminal device 100 and the terminal device 200 operate under the program control, and are connected with each other via a network 500. The network 500 may be an arbitrary network, for example, an optical fiber, the Internet, public line, LAN (Local Area Network), or ADSL (Asymmetric Digital Subscriber Line). A communication method may be made by wire or wirelessly.

Herein, the terminal device 100 is an information processing apparatus such as a portable telephone set including a communication function, and includes a known configuration comprising such as a wireless communication part, a display part, an operation part, a voice processing part (microphone, speaker), memory, and a control part. Though the terminal device 100 is described as a portable telephone set in the following, the terminal device 100 is not limited to the portable telephone set, but may be a PDA, a personal computer or a fixed telephone set.

The terminal device 200 is an information processing apparatus such as a portable telephone set including a communication function, and includes a known configuration comprising such as a wireless communication part, a display part, an operation part, a voice processing part (microphone, speaker), memory, and a control part. Though the terminal device 200 is described as the portable telephone set used for the party at the other end of the terminal device 100 in the following, the terminal device 200 is not limited to the portable telephone set, but may be a PDA, a personal computer or a fixed telephone set.

Referring to FIG. 2, the detailed configuration of the terminal device 100 and the terminal device 200 will be described below.

Each of the terminal device 100 and the terminal device 200 comprises a wireless sending/receiving part 1, an electronic mail receiving part 2, an image ID detection part 3, an image data management part 4, an image display part 5, an electronic mail address management part 6, an electronic mail address designation part 7, an electronic mail sending part 8, an image ID setting part 9, and an image designation part 10.

Referring to FIG. 3, the operation flow of this embodiment will be described below in detail. In the following, it is presupposed that the self-side terminal is the terminal device 100 and another terminal is the terminal device 200.

First of all, to switch the images displayed on the terminal device 200 that is another terminal, when it is detected that the operator of the terminal device 100 makes an input into the image designation part 10 during telephone conversation, the image designation part 10 sends the information to the image ID setting part 9 (step S301). The digit buttons of the portable telephone set are used for the image designation part 10.

The image ID setting part 9 sets an ID of the image displayed on another terminal to the electronic mail sending part 8 based on the information from the image designation part 10 (step S302).

The electronic mail sending part 8 sends the designated image ID to the electronic mail address of the terminal device 200 set by the electronic mail address management part 6 from the wireless sending/receiving part 1 to the terminal device 200 (step S303).

Herein, the electronic mail address management part 6 allows the user of the terminal device 100 to set the electronic mail address designation during telephone conversation with the electronic mail address designation part 7.

On the other hand, the terminal device 200 sends an electronic mail from the wireless sending/receiving part 1 to the electronic mail receiving part 2 (step S304).

The electronic mail receiving part 2 detects that the electronic mail is the same as the electronic mail address designated by the electronic mail address management part 6, and outputs the data to the image ID detection part 3 (step S305).

The image ID detection part 3 analyzes the image ID, and designates the image displayed to the image data management part 4 (step S306).

The image data management part 4 outputs the designated image to the image display part 5 (step S307).

The image display part 5 displays the image (step S308).

In this manner, though the conventional portable telephone terminal displays a fictitious character image on another terminal, and controls motion or expressions of an image by key operation, the switching of image data stored in another terminal may be designated using electronic mail without transmitting an image.

Also, though the "electronic mail" is transmitted to another terminal in switching the images displayed on the party at the other end, a "multi-call function" provided for the portable telephone may be employed, besides the electronic mail, to send out a switching signal to the party at the other end to achieve the same effect.

With the above embodiment, it is possible to switch the images displayed on a screen of the party at the other end during telephone conversation without transmitting the images. Accordingly, it is possible to switch the images displayed on the screen of the party at the other end without having a function of sending images to the terminal at the other end or a function of receiving the image from the terminal at the other end.

Thereby, the portable telephone terminal can reduce the conventional function of communicating images, simplify the configuration and cut down the current consumption.

The user of the portable telephone can dispense with sending image data to the party at the other end, and cut down the charge according to the use of the portable telephone, whereby problems rarely occurred such as the image is disordered due to degraded wireless line quality because data stored in the portable telephone are employed to display the image.

Also, the portable telephone system provider has the effect of reducing the amount of line transmission.

A second embodiment of the present invention will be described below with reference to the drawings. Though an instruction for switching the images at the other terminal is made using the electronic mail in the first embodiment, the switching is made using a tone in this embodiment.

Referring to FIG. 4, each of the terminal device 100 and the terminal device 200 according to this embodiment comprises a wireless sending/receiving part 1, a voice processing part 21, an image discriminating tone detection part 22, an image data management part 4, an image display part 5, an image discriminating tone generation part 23, and an image designation part 10.

Referring to FIG. 5, the operation flow of this embodiment will be described below in detail.

First of all, to switch the images displayed on another terminal, if it is detected that the operator of the portable telephone makes an input from the image designation part 10 during telephone conversation, the image designation part 10 sends the input information to the image discriminating tone generation part 23 (step S501).

Also, the image discriminating tone generation part 23 generates a discriminating tone of the image displayed on another terminal based on the information from the image designation part 10 and outputs the discriminating tone to the voice processing part 21 (step S502).

The voice processing part 21 multiplexes the discriminating tone generated by the image discriminating tone generation part 23 on the voice of the talker and sends the multiplexed voice to the terminal at the other end (step S503).

On the other hand, on the party at the other end, a received signal is outputted from the wireless sending/receiving part 1 to the voice processing part 21 and converted into voice by the voice processing part 21 (step S504).

The conversation voice is also outputted to the image discriminating tone detection part 22, which then detects the discriminating tone of the image displayed on the screen and designates the displayed image to the image data management part 4 (step S505).

The image data management part 4 outputs the designated image to the image display part 5 (step S506).

The image display part 5 displays the image (step S507).

In this manner, though the conventional portable telephone terminal displays a fictitious character image at another terminal, and controls the motion or expressions of the image by key operation, the switching of image data stored in another terminal may be designated by having a function of multiplexing and detecting the tone for designating the display image without transmitting the image.

According to this embodiment, since it is unnecessary to send an image data switching signal to another terminal via another channel, there is a merit that the amount of wireless transmission can be smaller than the first embodiment.

A third embodiment of the invention will be described below. Though a key button operation is performed in switching the images displayed on the party at the other end in the above first embodiment, a camera provided for the portable terminal reads or capture an expression of the talker, and the switching is made using a tone according to the expression to send a switching signal of the images displayed on the party at the other end in this embodiment.

In a fourth embodiment of the invention, images to be displayed during telephone conversation is sent to the conversation party on the terminal at the other end, prior to telephone conversation, and the receiving side of the image data includes a function of displaying the image data during telephone conversation.

Though the preferred embodiments of the invention have been described above, various modifications may be made without departing from the spirit or scope of the invention. For example, a process for implementing the functions of this system may be made by reading and executing a program for implementing the functions of the terminal device 100 and the terminal device 200 according to this embodiment into each device. Further, the program may be provided via a computer readable recording medium such as a CD-ROM or optical magnetic disk, or transmitted via a transmission medium such as the Internet or telephone line on the transmission wave to another computer system.

Though each of the above embodiments has been described above in connection with the system configuration in which the terminal device 100 and the terminal device 200 are connected separately, the invention may be also applicable to the configuration in which each function is implemented as one computer system, or a plurality of servers are added for the functions.

The invention claimed is:

1. An image display system comprising:
an image transmission terminal;
a camera to capture an expression of a user during a telephone conversation;
wherein an image identifier is specified by using said captured expression, and
an image receiving terminal with a display unit and a memory storing images,
wherein said image transmission terminal detects an input for specifying an image identifier during the telephone conversation with said image receiving terminal and sends said specified image identifier by using electronic mail,
wherein said image receiving terminal confirms an address of a sender of said electronic mail upon receiving said electronic mail,
wherein said image receiving terminal extracts an image corresponding to said received image identifier from said memory and displays said extracted image to said display unit upon confirming that the sender of said electronic mail is said image transmission terminal, and
wherein said image transmission terminal sends said specified image identifier by using a multi-call function.

2. The image display system according to claim 1, further comprising:
a key button to be used to input said image identifier by the user during the telephone conversation.

3. A method comprising:
detecting, by an image transmission terminal, an input for specifying an image identifier during a telephone conversion with an image receiving terminal, wherein the detecting the input to specify said image identifier comprises: capturing, by a camera, an expression of a user during the telephone conversation and specifying said image identifier by using said captured expression;
sending, by said image transmission terminal, said specified image identifier to said image receiving terminal, by using electronic mail;
receiving, by said image receiving terminal, said specified image identifier;
upon receiving said electronic mail, confirming, by said image receiving terminal, an address of a sender of said electronic mail; and,
upon confirming that the sender of said electronic mail is said image transmission terminal, extracting, by said image receiving terminal, an image corresponding to said received image identifier from a memory of said image receiving terminal and displaying, by said image receiving terminal, said extracted image,
wherein sending said specified image identifier is performed using a multi-call function.

4. The method according to claim 3, wherein detecting the input to
specify said image identifier comprises detecting a pressing of a key button by the user to
input said image identifier.

5. An image receiving terminal of an image display system, comprising:
a display unit to display an image;
a memory to store an image; and,
a processing unit to receive an image identifier specified by and sent from an image transmission terminal of the image display system using electronic mail, to confirm an address of a sender of said electronic mail upon receiving said electronic mail, and to extract said image corresponding to said image identifier from said memory and to cause the display unit to display said image upon confirming that the sender of said electronic mail is said image transmission terminal,
wherein said image identifier is specified by using a captured expression of a user at the image transmission terminal, and
wherein said image identifier is received using a multi-call function.

6. The image receiving terminal of claim 5, wherein said image identifier is input by the user using a key button of the image transmission terminal during a telephone conversation.

* * * * *